Patented June 9, 1931

1,809,770

UNITED STATES PATENT OFFICE

WALTER T. WINCKLER, OF CHICAGO, ILLINOIS, ASSIGNOR TO THE VON WINKLER LABORATORIES, INC., OF CHICAGO, ILLINOIS, A CORPORATION OF ILLINOIS

PROCESS OF MAKING SILVER SALT OF AMINO SULPHONATED CASTOR OIL

No Drawing. Application filed June 11, 1930. Serial No. 460,550.

The main objects of this invention are to provide an improved process of making a pharmaceutical compound which contains chemically combined silver free from proteinates, in a form which resists decomposition and can be hermetically sealed in ampules, without deterioration, for an indefinite period; and to provide a pharmaceutical compound which effectually attacks disease germs without causing irritation or burning of normal tissues.

The steps in my new and improved process are as follows:

A. Sulphonated castor oil is formed in the usual manner by the cautious addition of chemically pure concentrated sulphuric acid to a definite amount of chemically pure castor oil. The mixture is kept at low temperature and allowed to stand for from 18 to 24 hours to complete the sulphonation.

B. The sodium salt of sulphonated castor oil is formed by the cautious addition of concentrated solution of a soluble sodium salt such as sodium carbonate, until the reaction is slightly alkaline toward litmus. The oil is then cleared by dilution with excess chemically pure ethyl alcohol to remove excess sodium salts. After the mixture has stood for from three to four days, the clear supernatant alcoholic liquid is decanted from the residue.

C. The silver salt of sulphonated castor oil is obtained by the cautious addition of excess silver nitrate solution to the alcoholic liquid from "B", until the reaction is complete and a white curdy precipitate results. This precipitate is carefully washed free of excess silver and nitric acid and then dried. An assay of the precipitate when properly prepared and dried shows a silver content of from 20 to 25%.

D. An autoclaved ethylene diamine compound. The above silver salt is mixed with water, and a definite amount (according to the silver content) of ethylene diamine is slowly added with constant stirring. After prolonged trituration the mixture is put into sealed containers and autoclaved under pressure until the reaction is complete. The resulting silver salt of amino sulphonated castor oil, or ricinoleic acid is a clear reddish brown liquid, miscible with water in all proportions.

E. The product is taken from the autoclave and cooled, and after assaying for silver is carefully diluted with double distilled water until the solution contains .018 grams of silver per c. c. This solution is allowed to stand for three or four days and then filtered. After filtration the solution is submitted to chemical, physical and bacteriological tests for its purity and germicidal strength.

F. Two percent solutions are then formed and again tested for purity and germicidal strength. When the product is found to conform to the several exacting chemical, physical and bacteriological tests used for standardization, it is placed in ampules and hermetically sealed. It is now ready for distribution. The finished product is known as the silver salt of amino sulphonated castor oil, or the silver salt of amino sulphonated ricinoleic acid.

I claim:

1. The process which comprises the preparation of a silver salt of amino sulphonated ricinoleic acid from the washed and dried silver salt of sulpho ricinoleic acid by the addition of ethylene diamine and the combination under pressure in an autoclave.

2. The process of obtaining the silver salt of amino sulphonated ricinoleic acid which comprises the preparation of pure sulphonated castor oil, of the addition of soluble sodium salts followed by silver nitrate to complete precipitation of the silver salt, washing and drying of the precipitate, dilution of the precipitate, and the combination with ethylene diamine, by digestion of the mixture in an autoclave.

Signed at Chicago this 29th day of May, 1930.

WALTER T. WINCKLER.